US010690451B2

(12) United States Patent
McKenna

(10) Patent No.: US 10,690,451 B2
(45) Date of Patent: Jun. 23, 2020

(54) TRANSPARENT PROJECTILE-PROOF PANES, DEVICES AND METHODS

(71) Applicant: Kris McKenna, Skowhegan, ME (US)

(72) Inventor: Kris McKenna, Skowhegan, ME (US)

( * ) Notice: Subject to any disclaimer, the term of this patent is extended or adjusted under 35 U.S.C. 154(b) by 0 days.

(21) Appl. No.: 16/185,531

(22) Filed: Nov. 9, 2018

(65) Prior Publication Data

US 2019/0178611 A1 Jun. 13, 2019

Related U.S. Application Data

(63) Continuation-in-part of application No. 16/126,421, filed on Sep. 10, 2018.

(60) Provisional application No. 62/559,602, filed on Sep. 17, 2017.

(51) Int. Cl.
*F41H 5/04* (2006.01)
*B32B 17/10* (2006.01)
*B32B 18/00* (2006.01)

(52) U.S. Cl.
CPC ........... *F41H 5/0407* (2013.01); *B32B 17/10* (2013.01); *B32B 18/00* (2013.01); *B32B 2255/20* (2013.01); *B32B 2307/558* (2013.01); *B32B 2571/02* (2013.01)

(58) Field of Classification Search
CPC ....... F41H 5/0407; B32B 17/10; B32B 18/00; B32B 2255/20; B32B 2307/558; B32B 2571/02
USPC .................................................. 89/36.08, 905
See application file for complete search history.

(56) References Cited

U.S. PATENT DOCUMENTS

| H001567 | H * | 8/1996 | Parsons | B32B 27/06 89/36.02 |
|---|---|---|---|---|
| 2008/0092729 | A1 * | 4/2008 | Cook | F41H 5/0407 89/36.02 |
| 2010/0154622 | A1 * | 6/2010 | Zachau | B32B 17/10036 89/36.02 |
| 2010/0242714 | A1 * | 9/2010 | Piscitelli | F41H 5/263 89/36.02 |
| 2012/0006190 | A1 * | 1/2012 | Zachau | B32B 17/10761 89/36.17 |
| 2012/0269995 | A1 * | 10/2012 | Leighton | B32B 7/04 428/34 |

* cited by examiner

*Primary Examiner* — Samir Abdosh
(74) *Attorney, Agent, or Firm* — James G. Shelnut; JEDA Patent Technologies

(57) ABSTRACT

The present application for patent is in the field of projectile-proof panels and devices and more specifically in the field of visually transparent projectile-proof panels which are light weight and suitable for goggles, helmets and other devices which benefit from being light weight.

3 Claims, 6 Drawing Sheets

TRANSPARENT PROJECTILE-PROOF PANES, DEVICES AND METHODS

REFERENCE TO PRIOR FILED APPLICATION

This application claims priority of the filing date of U.S. Provisional Patent Application Ser. No. 60/559,602, filed 17 Sep. 2017, entitled "Bullet-Proof Glasses, Devices and Methods" which application is incorporated by reference herein in its entirety. This application is a Continuation-in-Part of U.S. Non-Provisional patent application Ser. No. 16/126,421, filed 10 Sep. 2018, entitled "Bullet-Proof Glasses, Devices and Methods" which application is incorporated by reference herein in its entirety.

FIELD OF INVENTION

The present application for patent is in the field of projectile-proof panels and devices and more specifically in the field of visually transparent projectile-proof panels which are light weight and suitable for goggles, helmets and other devices which benefit from being light weight.

BACKGROUND

The present disclosure relates to novel visually transparent, projectile-proof panels suitable for window systems of every type: armored vehicles, banks, schools, jewelry stores, embassies, hospitals, courtrooms, correction facilities, home storm windows, particularly hurricane windows, and the like. The disclosed novel panels and window systems are also useful for eye protection for helmets, goggles, military headwear, police protection and in application wherein the user needs to have protection from bullets, fragmentation (frag), and explosive debris including projectiles of extremely high speed. Further, the disclosed projectile-proof panels and window systems allow the user to continue to see through the projectile-proof panels and windows even after the bullet, frag or projectile has impacted the inventive window.

Bullet-proof and projectile-proof glass (also known as ballistic glass, transparent armor, or bullet-resistant glass) is a type of strong but optically transparent material that is particularly resistant to being penetrated when struck. It is made from laminated glass, in which two or more sheets of glass are laminated together with two or more plastic sheets, oftentimes with high levels of heat treatment to cause significantly high adhesion of the glass sheets to the plastic laminating materials. These sheets are typically bonded together using adhesive interlayers such as polyvinyl butyral, polyurethane, ethylene vinyl acetate, epoxy resin systems or combinations thereof. The index of refraction for all sheets used in the bulletproof layers must be almost the same to keep the glass transparent and allow a clear, undistorted view through the glass.

It is known that higher levels of bullet/projectile resistance may be achieved by increasing the thickness of the laminates, either thicker glass or thicker plastic, or by increasing the number of glass sheets or plastic sheets, to the detriment of light transmission through the glass. Bullet-proof glass typically varies in thickness from ¾ to 3½ inches (19 to 89 mm). At these thicknesses, weight becomes a critical and overruling parameter in applications such as in goggles, helmet eye protection, even car windows or bank windows, and the like.

Increasing the number layers of glass, plastic and/or adhesive are also known to provide for higher protection from bullet and projectiles. However, the increases in the number of layers results in higher weight, higher cost and decreased visibility.

It is known, for example in U.S. Pat. No. 7,584,689 to Jones etal, that increasing the thickness of composites, either glass, ceramic, plastic or combinations thereof will improve the penetration resistance of a projectile. For example, a 21.2 mm thick composite weighing 1.22 kg (2.68 pound) will prevent penetration by a 7.62×51 M-80 ball travelling at 2739 fps (feet per second), but the same ball at 2834 fps will penetrate. Increasing the thickness of the composition to 29.4 mm and weight to 1.63 kg (3.59 pounds) will prevent penetration. While useful in many applications, the composites are thick, heavy and expensive. Which prevents them from being used in other applications, such as, for example, goggles, protective helmets, windows of space vehicles, which protect the eyes and other desired protections.

It has been ingrained in the safety glass and bullet-proof technology that any layers of the safety glass or bullet-proof construction must be laminated together to provide a continuous composite structure. The rule being that when a projectile hits the safety glass or bullet-proof structure, spalling occurs, and small splinters of the glass, ceramic or other materials will fly around and possibly cause injury. Bonding of the layers helps to prevent this. However, when the glass, ceramic or other material spalls and shatters, there are always a plethora of cracks, lines, spider-webbing and the like. These make the structures opaque in that it is impossible to see through the area which has been struck by a projectile. In cases where the safety glass or bullet-proof structure is in large format there are other areas which provide sight. However, projectile-proof goggles or helmets or other smaller format devices fitted with protective eye gear are not of large format and do not have the luxury of other areas to be used for sight, and thus spalling, cracking, spider-webbing and other sight-preventing defects from a projectile strike make it virtually impossible to see, such that, the wearer either needs to remove the protective devices in order to flee the area or must dangerously stumble to remove him/her self from harm. The lamination construction of these bullet-proof and safety glass maintains all the glass shards and other defects intact. Additionally, in the case of military or police uses, with the now opaque goggles or helmet eye gear, the wearer cannot make the decision to continue fighting when such a decision is necessary for survival.

When a weight reduction is needed 3mm of polycarbonate (a thermoplastic) is laminated onto what would be considered the inside, or safe side of the panel. This polycarbonate stops the spall and by doing so maintains the cracks, spider-webbing and other sight-preventing defects in the glass. The aim is to make a material with the appearance and clarity of standard glass but with effective protection from small arms The plastic in laminate designs also provides resistance to impact from physical assault from blunt and sharp objects. The plastic provides little in the way of bullet-resistance. The glass, which is much harder than plastic, flattens the bullet, and the plastic deforms, with the aim of absorbing the rest of the energy and preventing penetration. The ability of the polycarbonate layer to stop projectiles with varying energy is directly proportional to its thickness, and bullet-proof glass of this design may be up to 3.5 inches thick. Again, this thickness limits its usefulness is many important and desirable applications.

All safety glass is designed so that all the layers, fragments and spalling, will remain intact after bullet, frag or projectile impact. This is suggested as a desirable feature so that glass fragments do not eject from the surface when impacted and possibly cause scratches or other shard related issues. By adhering all the layers together, they jointly absorb all the energy of the bullet, frag or projectile. Because the layers absorb all the energy of the bullet, the material weakens during impact, so that the ability to prevent bullet with high impact speed/energy from penetrating the bulletproof glass is limited. In order to improve the impact resistance of high speed/energy bullets, the layers must be thicker, which, by doing so, increases the weight and thus limits the applications into which the bulletproof glass may be used.

It is also well known that when the currently available bulletproof glasses are impacted by a bullet, frag or projectile the glass will spall and generate an enormous amount of cracking, spidering and shattering, so that the glass becomes totally opaque. When this happens in goggles or the sight port of a helmet, the person using the helmet or goggles can no longer see, and thus needs to remove the helmet or goggles in order to retreat, leave or perform any other activity after the bullet has impacted the bulletproof glass. As can be seen, in many situations removing the protection can be extremely dangerous, even fatal, such as in combat situation where removing a helmet puts the user in severe danger.

Some recent systems use a "standoff" construction which includes layering two or more bulletproof glass laminates together with a space between them in order to absorb more of the energy from the bullets. Since typical bullet proof glass is 20 mm thick, and common laminate safety glass is about 5 mm thick, an overall width for the system was chosen as about 75 mm, to avoid an impractically thick overall window system, indicating a desired standoff gap in the 50-65 mm range. These systems are very thick and high in weight resulting in a significant limit to their usefulness. For example, U.S. Pat. No. 7,174,692 to Vickers etal disclose the use of an air gap between two glass/plastic multilayer laminated panels which include dampening structures between the panes to absorb energy. The system also uses the release valves between the panels to allow air from the air gap to release when pressure from a projectile strikes the panel. No dimension of the gap is disclosed. Again, multilayer laminated panels are central to the disclosure. Also, this system is heavy, expensive and unsuitable for many applications where there is need for a light weight, inexpensive, and uncomplicated projectile-proof panel is required.

Thus, there is an unmet need for improved projectile-proof glass systems which can withstand the impact of high speed/energy projectiles while at the same time reduces the weight of the glass and provide visibility after impact and thus provide broader applications. Also, one unmet need is to provide projectile-proof panels and systems through which maintains a high level of transparency after being struck by a projectile allowing a person to maneuver without removing the panel or system.

SUMMARY OF THE DISCLOSURE

Figure 1:
FIG. 1 shows a photo of the result of a 2.2" thick piece of currently, commercially available laminated bulletproof glass after being struck by a bullet at a velocity of approx. 2000 fps.

Disclosed and claimed herein are novel visually transparent projectile-proof panels which are light weight and maintain visual transparency after being struck by a high-speed projectile for use in helmets, goggles and other devices which require low weight.

In a first embodiment, disclosed and claimed herein are projectile-proof, visually transparent panels, comprising at least one glass or ceramic subpanel having edges and a front and a back surface and at least one plastic subpanel having edges and a front and a back surface, wherein the back surface of the at least one glass or ceramic subpanel is positioned to abut the front surface of the at least one plastic subpanel, wherein the surfaces are not bonded together.

In a second embodiment, disclosed and claimed herein are projectile-proof panels of the above embodiment, further comprising at least one inner ceramic subpanel having edges and a front and back surface positioned to abut the front surface of at least one glass or ceramic subpanel or between the back surface of the at least one glass or ceramic subpanel and the front surface of the at least one plastic subpanel, wherein the surfaces of the at least one ceramic subpanel are not bonded to any other surfaces.

In a third embodiment, disclosed and claimed herein are projectile-proof panels of any of the above embodiments wherein any surfaces of the glass subpanel or plastic subpanel are coated with a ceramic coating.

In a fourth embodiment, disclosed and claimed herein are projectile-proof panels of any of the above embodiments wherein the at least one glass subpanel is positioned distal to an object being protected from a projectile and the at least one plastic subpanel is positioned proximal to an object being protected from a projectile.

In a fifth embodiment, disclosed and claimed herein are projectile-proof panels of any of the above embodiments wherein an open space is provided between the surface of the at least one glass subpanel and the surface of the at least one plastic subpanel, wherein the space ranges from the space resulting from abutting the back surface of the at least one glass subpanel and the front surface of the at least one plastic subpanel to about 2 centimeters.

In a sixth embodiment, disclosed and claimed herein are projectile-proof panels of any of the above embodiment wherein the subpanels may be chosen to be of the same dimensions or any of the subpanels may be chosen to be larger or smaller than the other subpanel depending on the device in which the panels are housed.

In a seventh embodiment, disclosed and claimed herein are projectile-proof panels of any of the above embodiments wherein any of the subpanels may be flat, curved or combinations of flat and curved.

In an eighth embodiment, disclosed and claimed herein are projectile-proof panels of any of the above embodiments, wherein the thickness of the subpanels ranges from about 2 mm to about 20 mm and the total weight of the panel ranges from about 20 grams to about 700 grams.

In a ninth embodiment, disclosed and claimed herein are projectile-proof panels of any of the above embodiments, wherein at least one of the glass subpanels is low iron glass, borosilicate glass, water white glass, diamond glass, chemically strengthen glass, single crystal sapphire ($\alpha$-Al2O3), polycrystalline Al2O3, or spinel.

In a tenth embodiment, disclosed and claimed herein are projectile-proof panels of any of the above embodiments further comprising energy absorbing structures situated between at least one of the glass or ceramic subpanels and at least one of the polymeric subpanels.

In an eleventh embodiment, disclosed and claimed herein are projectile-proof devices comprising any of the above embodiments.

In a twelfth embodiment disclosed and claimed herein are projectile-proof panels of any of the above embodiments wherein the device contains a component into which the panel or any subpanels or inner panels may be positioned.

In a thirteenth embodiment, disclosed and claimed herein are projectile-proof panels of any of the above embodiments wherein the component is configured to allow removal and insertion of the panel or any one or more of the subpanels and wherein the component may contain electronic connection or connecting to any panels or subpanels which are electronic devices.

In a fourteenth embodiment, disclosed and claimed herein are projectile-proof devices containing of any of the above embodiments.

DESCRIPTION OF THE INVENTION

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

As used herein, the conjunction "and" is intended to be inclusive and the conjunction "or" is not intended to be exclusive unless otherwise indicated. For example, the phrase "or, alternatively" is intended to be exclusive.

As used herein, the term "and/or" refers to any combination of the foregoing elements including using a single element.

As used herein the term "transparent" refers to the property of a material which allows for the transmission of light to pass through and provide a clear, or at least discernible, image of objects to be viewed. The material may be transparent to one or more of UV, visible, infrared and the like radiation.

The term "projectile" means a bullet, ball, flak, shrapnel, debris from explosive, from IED's or other bullet-like objects travelling at high speed.

The terms "projectile-proof" and "bullet-proof" are used interchangeably and refers to the property of a material that prevents a projectile from completely penetrating through the material.

As used herein the term "glass" refers to glasses, ceramics, transparent materials and the like.

As used herein the phrases "front surface" and "back surface" when discussing the disclosure's embodiments refer to the position of the surfaces relative to the person or object being protected, that is, a subpanel with two surfaces has one closer to the person or object and called the "back surface" while the surface away from the person or object being protected is call the "front surface".

As used herein the term "panel" refers to any combination of glass, ceramic and plastic layers each of which is referred to as a "subpanel" such that subpanels are combined to make panels.

As used herein the term "device" refers to any manufacture that includes the inventive panels regardless of size.

It has surprisingly been found that, contrary to popular teachings, when the surface of one or more layers of visually transparent, bullet-proof or projectile-proof glass subpanels are positioned abutting the surface of one or more layers of plastic subpanels, without any adhesive, or bonding, material holding the surfaces together to form a projectile-proof panel, the ability to withstand high speed/energy bullets, frag or projectiles is significantly improved beyond what can be achieved from typical, currently available projectile-proof glass systems. When more than one glass subpanel and/or more than one plastic subpanel is used, the surfaces of these subpanels also are not bonded to each other. As well, materials have been found which can further provide increased resistance to penetration in these non-adhesive, non-bonded constructions and are light weight.

Glasses useful for the current disclosure include, but are not limited to, for example, those glasses that are used in commercially available laminated safety glasses and laminated projectile-proof and bullet-proof glass laminates, for example, low iron glass, borosilicate glass, water white glass, diamond glass, chemically strengthen glass, and the like. Other useful glasses include, for example, zinc sulfide, zinc sulfide with a hard coating, such as, for example, AlGaP and diamond like carbon coating, single crystal sapphire ($\alpha$-Al2O3) glass/ceramic, polycrystalline Al2O3, aluminum oxynitride, spinel, for example, MgAl2O4, alkali-aluminosilicate glass, such as Gorilla glass and the like.

Plastic subpanels useful in the current disclosure include, for example, polycarbonate such as Lexan®, ionomers such as Surlyn®, glass-filled polycarbonate, acrylics such as polymethylmethacrylate, Plexiglass®, monolithic acrylics and other visually transparent plastic sheets as are typically used is visually transparent projectile proof laminates as well as other sheets of other visually transparent polymers, including, for example, PET (polyethylene terephalate), amorphous copolyester, PVC, silicon rubber, cyclic olefin copolymers, polyethylenes, transparent polypropylene, polystyrene, styrene-methyl methacrylate, styrene acrylonitrile, ABS and the like.

In use, the individual panels may be fitted into a component of a device. The component may be a frame, a holding bracket, or support structure that positions them in a goggle, helmet, window or other visual device. They may be fixed, or bonded, at their edge. Alternatively, the subpanels may be fitted into a frame, holding bracket or support structure without bonding. In this configuration, subpanels may be readily removed from the frame into which they are placed on the goggle or visual device when desire without having to replace other parts of the device. For example, after a projectile has struck the panel and caused damage, any or all of the subpanels may be readily removed, and new subpanels may be inserted as required or desired. In this construction the wearer may continue to operate without having to remove him/her self from an operation.

While not being restricted, other visually transparent inner subpanels may be inserted into the panel, such as, for example, inner ceramics. In these embodiments, wherein the subpanels are not fixed to a frame or support, and since the surfaces of the subpanels are not bonded, other subpanels may be readily inserted and/or removed as desired. These additional subpanels may include, for example, light filters, infrared imagers, ultraviolet imagers, electronic information displays, magnifiers and the like. In the embodiments wherein, the additional subpanels are electronic, they could be inserted into electronic portals in a device component, such as, for example, positioned on or in the device, such as, for example, USB ports, electrical connectors, and the like.

Other subpanels may be inner subpanels and include, for example, visually transparent ceramic subpanels that can improve penetration resistance of projectiles. One or more ceramic subpanels having edges and a front and back surface may be added to the projectile resistant panel. It can be positioned to abut the front surface of at least one glass subpanel or between the back surface of the at least one glass subpanel and the front surface of the at least one plastic subpanel. The surfaces of the at least one ceramic subpanel are not bonded to any other surfaces. In other embodiments a ceramic layer may be coated onto any of the glass subpanel surfaces or any of the plastic subpanel surfaces to impart scratch resistance as well as improved penetration resistance, such as by CVD (chemical vapor deposition). Ceramics useful in the current disclosure include, for example, non-polycrystalline ceramic such as, for example, single crystal sapphire (Al2O3)).

In use, the one or more glass subpanels are positioned so that they are distal to (away from) the person or object being protected, while the one or more plastic subpanels are positioned proximal (closest to) the person or object being protected. In operation, when a projectile strikes the first subpanel, the one or more glass subpanels, the glass will shatter and be ejected away from the person or object being protected. In this configuration, no glass shards can be ejected into the device holding the subpanels.

In some embodiments of the current disclosure, the surface of the glass subpanel is positioned in a non-bonded fashion abutting the surface of the plastic subpanel. In other embodiments the surfaces of the subpanels are separated by a space. The space can range from 1 nm to 2 cm. In these embodiments, further subpanels, as mentioned above, can be readily inserted if desired. In some embodiments the space between the subpanels may ne filled with liquids or gas, such as, for example, cooling liquid, nitrogen or other transparent materials designed to improve sight throughout the electromagnetic spectrum.

In use the subpanels may have the same edge dimensions, or they may have different dimension. They may have a general square, rectangular, trapezoidal or other complex geometric shapes. The shape depends on the device into which the subpanels are place. For example, the panel may have a glass subpanel smaller than the plastic subpanel wherein the edges of the plastic subpanel directly insert into the device. The panels may be chosen to have the same of different geometric shape. For example, the panel and/or subpanels may be circular, oval, square, rectangular, triangular, pentagonal, hexagonal, oblong, or any other shape as is well known to a person of ordinally skill.

Some or all of the subpanels, including, for example, the glass subpanels, plastic subpanels and other subpanels, may be entirely flat or may have curvature throughout their entirety, such as a curved, round subpanel, a curved, ovate subpanel or other complex configuration, or they may be a combination of flat in some areas and curved in other areas as chosen for a particular design.

The thicknesses of the subpanels may range from about 2 mm to about 20 mm. As mentioned thicker panels are more readily projectile-proof than thinner panels. However, the weight, cost and transparency suffer when the thickness is too great. The weight of the panel, when all the subpanels are inserted ranges from about 20 grams to about 700 grams when the panels are used in devices that are worn by a user. For example, the panels used in goggles cannot exceed a certain weight, for example 16 oz, as the wearer would fatigue and find it very difficult to operate under the weight stress. In other application, such as satellite windows, reduction of weight is important for lift-off calculations as well as overall payload considerations. The disclosure is not limited to these weights and thicknesses. There are a number of useful applications which would benefit from the use of the panels of the current disclosure, including, for example, large format window buildings, transportation vehicles and the like with thicknesses up to 12 inches and beyond, weighing up to 100 pounds and above. The object of these panels is to prevent penetration of high velocity projectiles which can not be accomplished with currently available projectile proof panels which are much thicker and much heavier.

The panels may include energy absorbing materials around the edges of the panel, such as, for example, rubber gaskets, rings or other components well known on the art to absorb energy.

The embodiments of the immediate application are designed to slow/deflect the incoming projectile to the point where it no longer has the kinetic energy to penetrate the back of the panel. Not to be held to theory, it is believed that when a projectile strikes the glass front subpanel of the projectile-proof panel of embodiments of the current disclosure, much of the energy of the projectile is dissipated throughout the glass subpanel from the excessive cracking of the glass. To cause cracking, energy is required, and that energy, it is believed, comes from the energy of the projectile. Since the glass of the embodiments of the current disclosure is now shattered into shards, and since the glass is not adherent to any plastic back panel, more of the projectile's kinetic energy is converted to the kinetic energy of the "flying" shard. As a further theory, because glasses suitable for the current disclosure, such as single crystal sapphire ($\alpha$-Al2O3) glass/ceramic, polycrystalline Al2O3, aluminum oxynitride, spinel, for example, MgAl2O4, alkali-aluminosilicate glass, such as Gorilla glass and the like, are extremely hard, the crystalline structure stores an enormous amount of energy holding the atoms and molecules together in the crystal. It takes a very large amount of energy to separate those atoms and molecules during a breaking/shattering event, and especially causing them to "fly" around. As a result, all or most of the energy of a projectile will be dissipated throughout the glass as it shatters and scatters resulting in removing energy from the bullet, frag or projectile and thus protecting the user of the non-bonded construct.

As well, typically a projectile deforms during impact converting the projectile's kinetic energy into heat and structural deformation. Any kinetic energy remaining from the initial strike is now absorbed by the plastic subpanel which can result in some opaqueness. The current teachings rely on the bonding of the glass front panel to the plastic rear panel to absorb the kinetic energy of the projectile to prevent is from penetrating the projectile-proof panel. As mentioned, current teachings teach relatively thick and heavy panels are needed to achieve non-penetration and in operation, the projectile-proof panel is completely opaque when a projectile strikes.

In operation, when the glass of the transparent projectile-proof panels of the current disclosure shatters and is removed from the surface, the remaining plastic layer remains essentially transparent, in that a person can still see through the layer and either flee to a safe area or continue fighting as the need presents itself. Of course, in these situations the glass, or now see through plastic as used in goggles or helmet windows, no longer affords the same protection as the unimpacted glass, but it does give the user the ability to safely continue wearing the protection without having to remove it, which would be even less safe.

In some embodiments, the glass subpanel may be replaced after a projectile strikes the panel and the glass is shattered and removed. A slot may be constructed in the panel frame into which a replacement glass subpanel may be inserted, thus allowing the user of a device containing the projectile-proof panel to continue functioning.

The construct of, for example, sapphire glass abutting a plastic such as, for example. Lexan, or other plastic material mentioned above and commonly used in the preparation of bulletproof glass, without being adhered to each other is completely unique in the science of bulletproof glass.

Bulletproof glass has been used for many years in vehicles such as armored bank vehicles for the transport of money. More recently, the use of bulletproof glass has increased in executive and government vehicles, particularly as an anti-terrorism measure. The occupants of these and other vehicles with such glass typically are not wearing helmets. If side curtain airbags are not provided in such vehicles, occupants of these vehicles can have significant head impacts with the bulletproof glass during motor vehicle accidents. Bulletproof side windows, typically with thicknesses in the range of 20 mm, present unforgiving impact surfaces in front oblique, rollover and side impacts. If occupant protection system designs do not provide sufficient lateral restraint to prevent injurious head impact with the bullet proof glass through use of side curtains or other design approaches, a passive impact protection system is desirable A layer of energy absorbent material placed on the inboard side of a bulletproof window is a possible passive solution, but the choices for such a material are limited. To be acceptable, the material must be clear and not distort vision through the window. Known materials with the required energy absorbent properties and clarity tend to scratch easily and/or yellow or become opaque with age, and thus are not suitable for vehicle applications. What is needed is a passive restraint system that retains the durability and optical properties of window glass.

Applications include blast resistance in which frag from bomb fly out in many directions and impact on the bulletproof window system of the current disclosure.

In other embodiments the layers of glass and plastic may be removably attached. In these embodiments the adhesion is minimal and designed to just provide non-slippage of the layers. This will allow the fragments of sapphire glass to be readily and easily removed from the surfaces of the construct when impacted by a bullet, frag or projectile.

EXAMPLES

Comparison:
FIG. 1 depicts the result of a 2.2" thick piece of currently, commercially available laminated bulletproof glass which passed the test of STANAG 4569, Level 2 withstanding a bullet velocity of approx. 2000 fps. As can be seen, once impact has occurred the typical bulletproof glass no longer acts as glass as it has become opaque. Note the thickness of 2.2 inches and its weight prevent its use in a number of important applications such as goggle, helmets and the like.

Experimental Examples

Well known standards for categorizing ballistic resistance include the following and are herein included by reference:
SUMMARY OF EURONATIONAL (EN) 1063 TEST CONDITIONS IN ENGLISH
SUMMARY OF UNDERWRITER'S LABORATORY (UL) BALLISTIC RESISTANCE TEST CONDITIONS IN ENGLISH
U.S. DEPARTMENT OF DEFENSE SPECIFICATIONS FOR PURCHASE OF TRANPARENT ARMOR—INCLUDES STANDARDS FOR BULLET RESISTANCE (ATPD 2352P).
U.S. NATIONAL INSTITUTE OF JUSTICE (NIJ) STANDARD FOR BALLISTIC RESISTANT PROTECTIVE MATERIALS (NIJ STANDARD 0108.010
ANSI Z87.1 STANDARD FOR HIGH ENERGY IMPACT
MIL-PRF 32432A MILITARY SPECIFICATION Example 1

¼" Sapphire Glass Subpanel with ¼" Lexan® Subpanel

One surface of a ¼" circular glass (Sapphire) subpanel was positioned directly onto the surface of a ¼" plastic (Lexan®) subpanel to provide a ½" panel without being bonded.

Figure 2B:
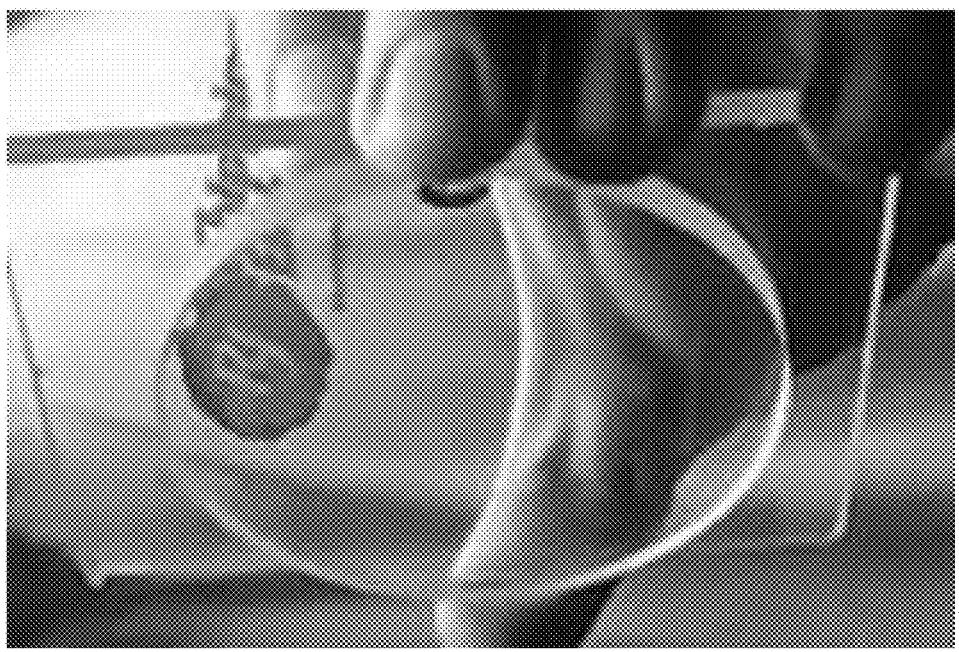
FIGS. 2A and 2B show a front view and a side view of one embodiment of the currently disclosed projectile-proof panel.
Figure 2A:
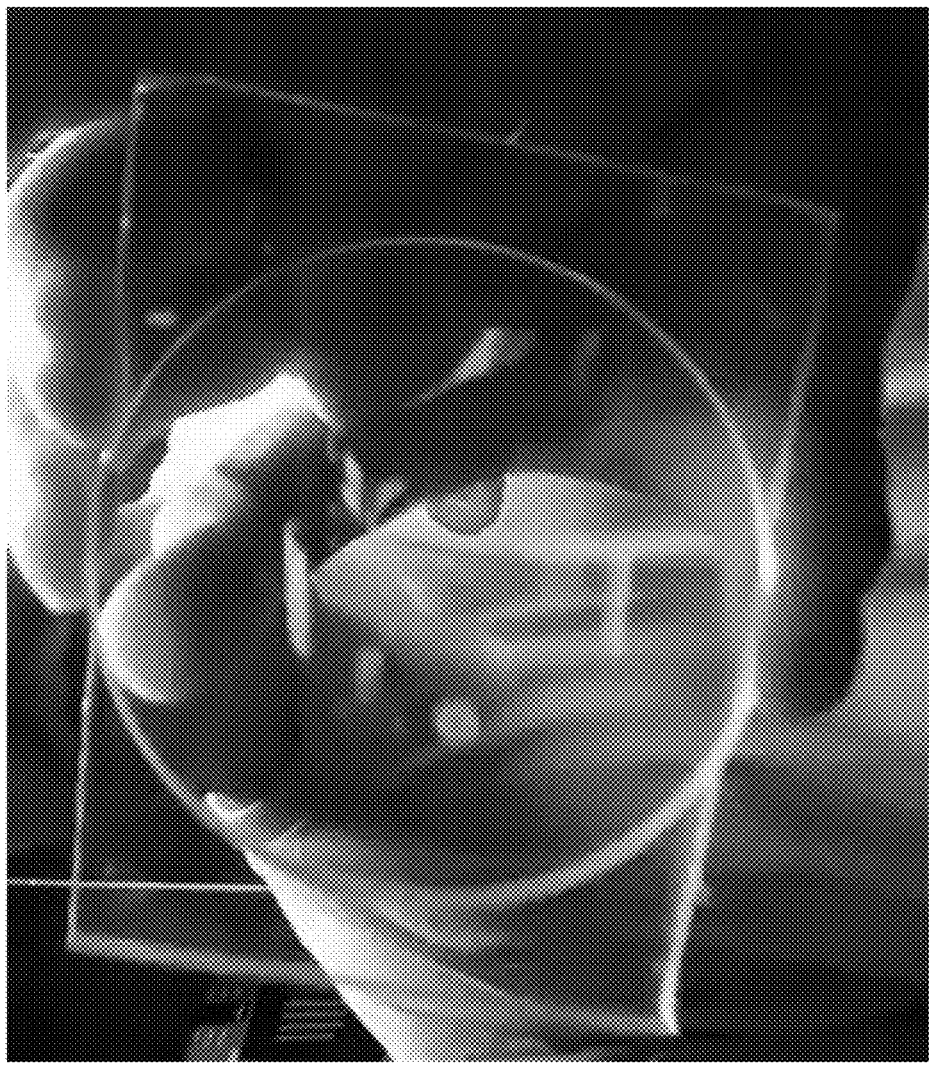

FIG. 2A and 2B show two actual views of the projectile-proof panel of the current disclosure. One surface of the ¼" circular glass (Sapphire) subpanel is positioned directly on onto the surface of the ¼" plastic (Lexan®) subpanel to provide a ½" panel.

Figure 3:
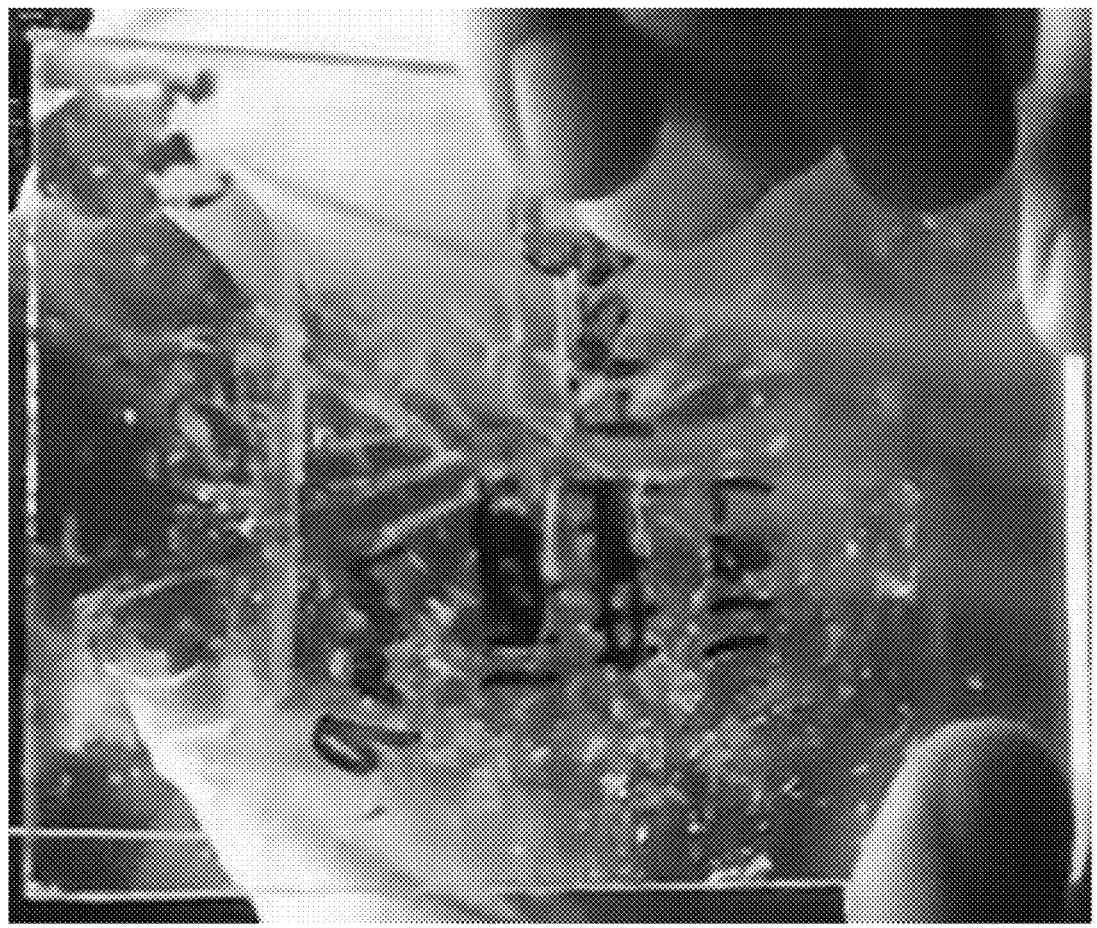
FIG. 3 shows a photo of the result of the currently disclosed projectile-proof panel after being struck by a 17 grain Frag at a velocity of 1187 fps.

FIG. 3 shows an actual photo of the currently disclosed projectile-proof panel after being struck orthogonally at 12" by a 9 mm bullet travelling at 1187 fps (feet per second). The glass layer has shattered and is no longer present and the plastic subpanel is not deformed. Also notice the transparency of the remaining Lexan®.

Figure 4:
FIG. 4 shows a photo of the result of the currently disclosed projectile-proof panel after being struck by a 17 grain Frag at a velocity of 1945 fps.

FIG. 4 shows an actual photo of the currently disclosed projectile-proof panel after being struck orthogonally at 12" by a 17 grain Frag travelling at 1945 fps. (A Frag is a piece of grenade or other explosive which can be of any shape including having very sharp edges, penetrating edges). As can be seen, the glass layer again has shattered and is no longer present Example 2

⅛' Sapphire Glass Subpanel with ⅛" Lexan® Subpanel

Figure 5:
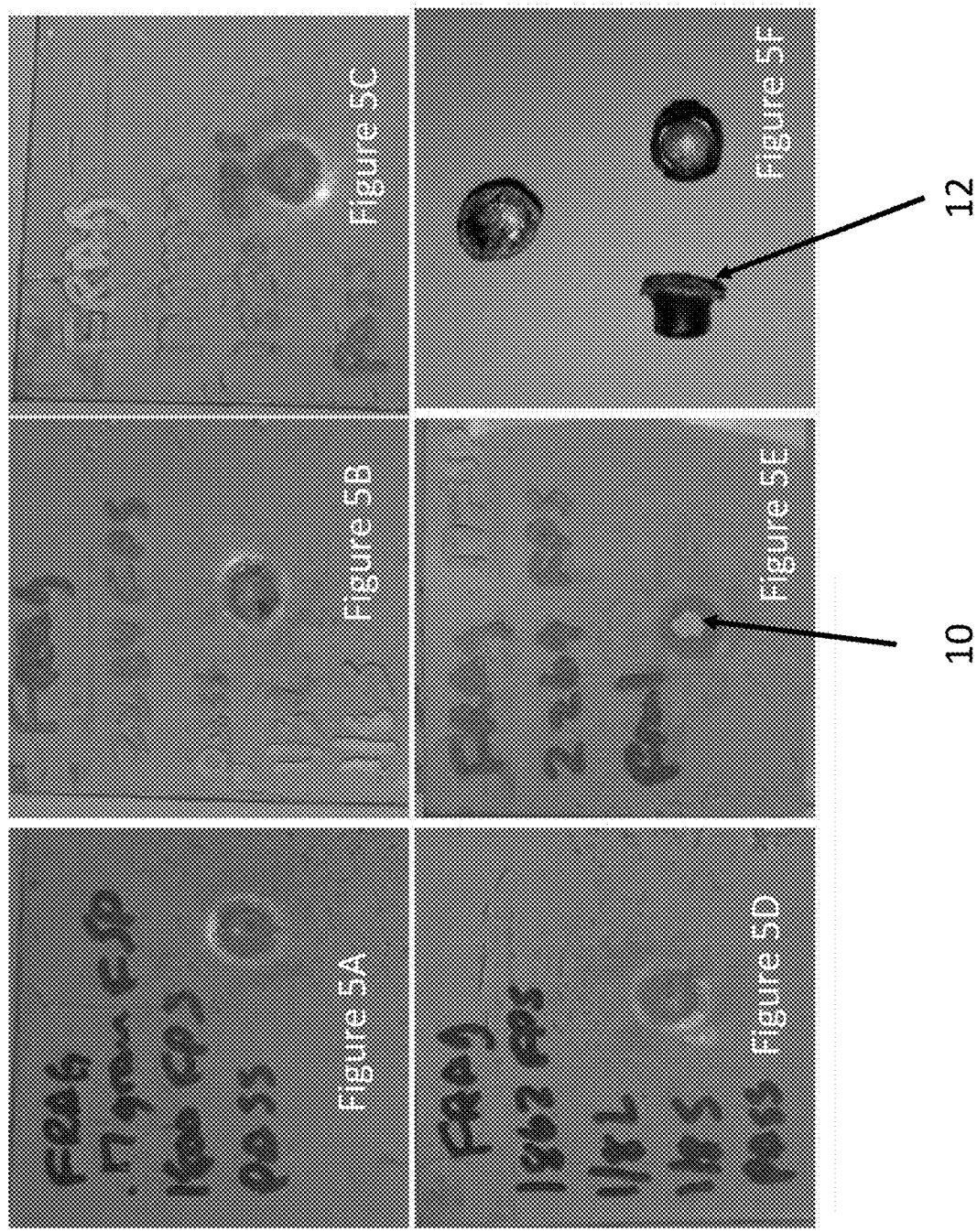
FIG. 5A-FIG. 5E show photos of the results of the currently disclosed projectile-proof panel after being struck by a 17 grain Frag at a variety of velocities from 1800-2269 fps.
FIG. 5F shows a photo of the 17 grain Frag after it has struck the panel of the current disclosure.

The panels of this experiment are ½ the weight of the previous experiment. FIG. 5 shows actual photos of the result of firing of 17 Frag projectiles at various speeds at the panel of the current disclosure. In these experiments the subpanels were reduced in thickness to ⅛" glass and ⅛" plastic giving a total thickness of the panel of ¼".

FIG. 5A shows 1800 fps.
FIG. 5B shows 2284 fps
FIG. 5C shows 1830 fps
FIG. 5D shows 1862 fps
FIG. 5E shows 2269 fps.
FIG. 5F shows how the Frag projectile "pancaked" after striking the panel of the current disclosure, 12. As can be seen, the panes of the current disclosure withstood striking velocity of 2284 fps and less. The velocity of 2269 fps cause penetration of the plastic subpanel as evidenced by the "hole: 10 in FIG. 5E. Again, the panel exceeded the ANSI Z87.1 Standard. The panel also exceeded the MIL-PRF Standard.

One important application for the panels of the current disclosure are ACH (Advanced Combat Helmets). In these applications a goggle system must meet NIJ IIIA standards, which state the panels must withstand a 17 grain Frag at 2200 fps at 0-degree incidence.

Example 3

Fused silica was substituted for Sapphire glass in Example 1, which also prevented a 9 mm projectile from penetrating as velocity of 1389 fps.

Example 4

¼" Sapphire Glass Subpanel and ½" Lexan® Subpanel

Tests performed on a panel of the current disclosure that incorporated ¼" Sapphire glass with ½" Lexan® subpanel showed that the panel could withstand a .357 Magnum strike at a velocity if 1240 fps at point blank.

The panel also stopped a Remington .223 caliber bullet from a Colt AR 15 semi-automatic rifle strike at a velocity of 3240 fps at point blank. The only currently available bulletproof glasses that withstand this velocity are extremely thick at 1.5 inches, and very heavy compared to ¾ 41 thickness of the example. Their application can only be used in extremely large format and expensive systems.

In both these examples, the transparency of the panel after the projectile strike was minimal in that a person could easily visually function after the strike.

Figure 6:
FIG. 6 shows three pictures of the result of the currently disclosed projectile-proof panel after being struck by a .223 caliber round from an AR15 travelling at a velocity of 3244 fps.
Figure 6:
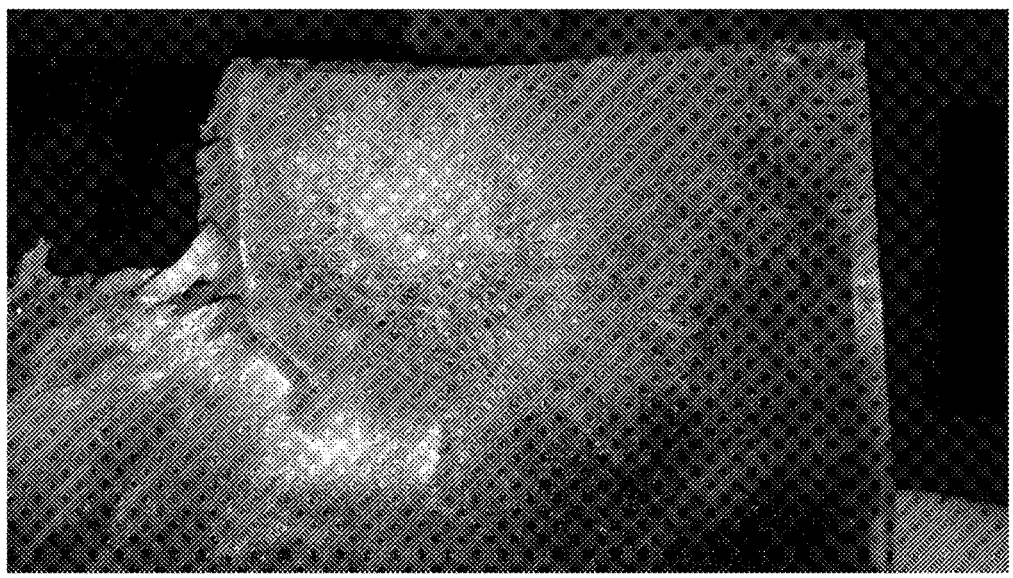
Figure 6:
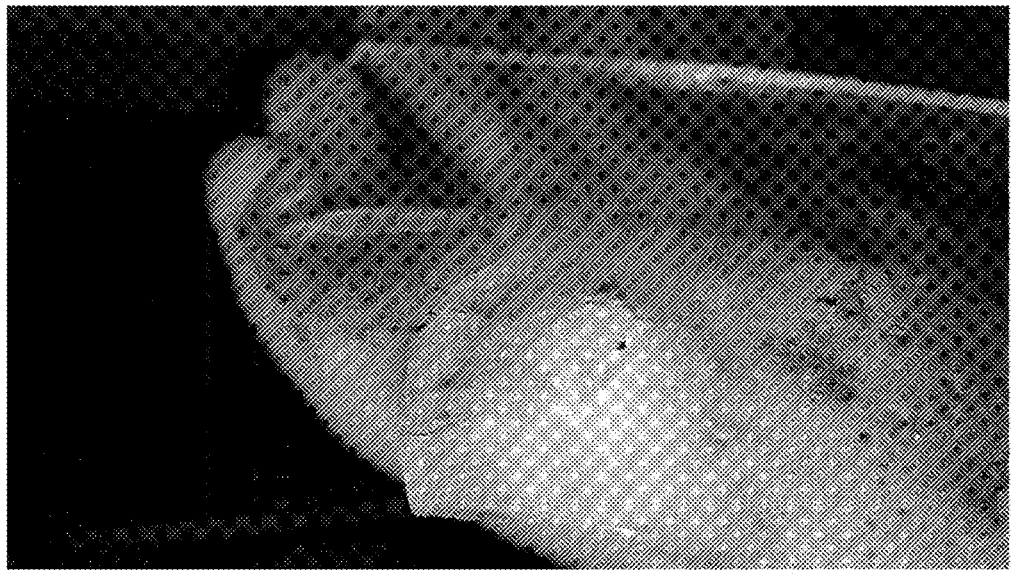

FIG. 6 shows three pictures of the panel of Example 1 of the current disclosure after a round from an AR 15 with velocity of approx. 3244 fps. The sapphire glass has been completely shattered and removed from the construct. What is shown is the resulting damage to the ¼" Lexan. Lexan on its own does not stop an AR 15 round. What this shows is that the sapphire glass reduces to speed and energy of the .233 round that the Lexan is able to withstand the impact of whatever energy remains of the round after impacting the sapphire. Though the Lexan deforms, the bullet does not penetrate, thus providing lifesaving properties.

NOTE: All transparent projectile proof panels of the examples of the current disclosure exceed the projectile proof standards, as listed above. As well, the examples of the currently disclosure transparent panels far exceed the projectile proof capabilities of currently available and disclosed transparent materials of the same dimensions and construction.

I claim:

1. A projectile-proof, visually transparent panel consisting of one single piece of glass or ceramic subpanel having edges and a front and a back surface and one single piece of plastic subpanel having edges and a front and a back surface, wherein the back surface of the glass or ceramic subpanel is positioned against the front surface of the plastic subpanel, wherein the subpanels are not bonded together, wherein the glass subpanel consists of low iron glass, borosilicate glass, water white glass, diamond glass, chemically strengthen glass, single crystal sapphire ($\alpha$-Al2O3), polycrystalline Al2O3, zinc sulfide, hard coated zinc sulfide or spinel.

2. A projectile-proof protection device consisting of a projectile-proof, visually transparent panel consisting of one single piece of glass or ceramic subpanel having edges and a front and a back surface and one single piece of plastic subpanel having edges and a front and a back surface, wherein the back surface of the glass or ceramic subpanel is positioned against the front surface of the plastic subpanel, wherein the subpanels are not bonded together, wherein the glass subpanel consists of low iron glass, borosilicate glass, water white glass, diamond glass, chemically strengthen glass, single crystal sapphire ($\alpha$-Al2O3), polycrystalline Al2O3, zinc sulfide, hard coated zinc sulfide or spinel.

3. A projectile-proof protection device consisting of a projectile-proof, visually transparent panel consisting of one single piece of glass or ceramic subpanel having edges and a front and a back surface and one single piece of plastic subpanel having edges and a front and a back surface, wherein the back surface of the glass or ceramic subpanel is positioned against the front surface of the plastic subpanel, wherein the subpanels are not bonded together, wherein the glass subpanel consists of low iron glass, borosilicate glass, water white glass, diamond glass, chemically strengthen glass, single crystal sapphire ($\alpha$-Al2O3), polycrystalline Al2O3, zinc sulfide, hard coated zinc sulfide or spinel, wherein the device consists of a component into which the subpanels are positioned, the component configured to allow removal and replacement of the subpanels and other panels.

* * * * *